United States Patent
Turner (10) Patent No.: US 9,824,599 B1
(45) Date of Patent: Nov. 21, 2017

(54) METHOD AND VEHICLE TRAFFIC CONTROL SYSTEM

(71) Applicant: GE AVIATION SYSTEMS, LLC, Grand Rapids, MI (US)

(72) Inventor: Mark Lawrence Turner, Grand Rapids, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 15/283,413

(22) Filed: Oct. 2, 2016

(51) Int. Cl.
*G08G 7/00* (2006.01)
*G08G 5/00* (2006.01)
*G08G 1/14* (2006.01)

(52) U.S. Cl.
CPC .............. *G08G 7/00* (2013.01); *G08G 1/146* (2013.01); *G08G 5/0026* (2013.01)

(58) Field of Classification Search
CPC ......... G08G 7/00; G08G 1/146; G08G 5/0026
USPC ....................................................... 340/932.2
See application file for complete search history.

(56) References Cited

U.S. PATENT DOCUMENTS

| | | | | |
|---|---|---|---|---|
| 4,232,313 | A * | 11/1980 | Fleishman | G01S 13/93 342/31 |
| 6,615,137 | B2 | 9/2003 | Lutter et al. | |
| 7,681,839 | B2 | 3/2010 | Mickley et al. | |
| 8,244,403 | B2 * | 8/2012 | Lin | G05D 1/0246 180/168 |
| 8,463,463 | B1 | 6/2013 | Feldmann et al. | |
| 9,322,651 | B2 | 4/2016 | Buehler et al. | |
| 2005/0200502 | A1 * | 9/2005 | Reusser | G01C 23/00 340/973 |
| 2011/0153205 | A1 * | 6/2011 | Stimac | G01C 21/24 701/408 |
| 2013/0107219 | A1 * | 5/2013 | Feldmann | G01C 21/24 353/11 |
| 2013/0278440 | A1 * | 10/2013 | Rubin | G08G 9/02 340/903 |
| 2014/0077975 | A1 * | 3/2014 | Khatwa | G08G 5/0013 340/972 |
| 2014/0268269 | A1 * | 9/2014 | Lopez | G02F 1/01 359/200.7 |
| 2015/0269449 | A1 * | 9/2015 | Kosaki | G06K 9/00805 382/103 |
| 2015/0284010 | A1 * | 10/2015 | Beardsley | B60W 50/10 701/41 |
| 2016/0252342 | A1 | 9/2016 | Feldmann et al. | |

OTHER PUBLICATIONS

U.S. Appl. No. 15/283,414, filed Oct. 2, 2016, Turner et al.
Non-Final Rejection towards related U.S. Appl. No. 15/283,414 dated Apr. 21, 2017.

* cited by examiner

*Primary Examiner* — Hirdepal Singh
(74) *Attorney, Agent, or Firm* — GE Global Patent Operation; William S. Munnerlyn (57) ABSTRACT

A system and method of generating plan information for vehicles in a vehicle traffic or vehicle parking zone, including projecting into space, from a set of grid generators at the vehicle traffic or vehicle parking zone, a set of lines defining a relative navigation grid and encoded with grid data configured to identify predetermined points on the relative navigation grid, and detecting, with a detector module on a vehicle, a location of the vehicle within the grid.

11 Claims, 7 Drawing Sheets

METHOD AND VEHICLE TRAFFIC CONTROL SYSTEM

BACKGROUND OF THE INVENTION

Relative navigation systems are useful for various applications such as manual or autonomous vehicle navigation in an environment such as a vehicle traffic zone or a vehicle parking zone. In some applications, only the relative positions (Px, Py, Pz, or Azimuth, Elevation, Slant Range) between two objects is utilized. In other applications, the relative range, as well as the relative velocity (Vx, Vy, Vz, or Azimuth Rate, Elevation Rate, Slant Range Rate) between two objects are utilized.

BRIEF DESCRIPTION OF THE INVENTION

In one aspect, the present disclosure relates to a vehicle traffic control system includes a set of grid generators, at a vehicle traffic or vehicle parking zone, with a grid generator configured to project into space a set of lines defining a relative navigation grid and encoded with grid data configured to identify predetermined points on the relative navigation grid, a vehicle having at least one detector module configured to generate a sensor output based on a location of the detector module in the relative navigation grid, a data module having information regarding vehicle size and dimensions and known physical features of the vehicle traffic or vehicle parking zone, and a control module configured to receive the sensor output, determine a location of the vehicle within the grid, retrieve or receive information from the data module, generate plan information for the vehicle traffic or parking zone and display, on the display, the generated plan information.

In another aspect, the present disclosure relates to a vehicle traffic control system including a communication link, a control module configured to receive a sensor output from a set of vehicles via the communication link, and determine a location of the set of vehicles within a navigation grid, a data module having information regarding vehicle size and dimensions and known physical features of the vehicle traffic or vehicle parking zone, and a plan generator module communicatively coupled with the control module and data module, and configured to generate plan information for the vehicle traffic or parking zone.

In yet another aspect, the present disclosure relates to a method of generating plan information for vehicles in a vehicle traffic or vehicle parking zone, the method including projecting into space, from a set of grid generators at the vehicle traffic or vehicle parking zone, a set of lines defining a relative navigation grid and encoded with grid data configured to identify predetermined points on the relative navigation grid, detecting, with a detector module on a vehicle, a location of the vehicle within the grid, and generating plan information, including at least one of guidance or holding information for the vehicle, based on the detected location, vehicle information, and information related to known physical features of the vehicle traffic or vehicle parking zone.

DESCRIPTION OF EMBODIMENTS OF THE INVENTION

The embodiments of the present invention are related to methods and apparatus for generating plan information for vehicles in a vehicle traffic or a vehicle parking zone. The method and apparatus can be used for a variety of applications involving or including a set of land, air, or water-based vehicles in a traffic or parking zone, including landing any type of vehicle having manual or "manned" operational control or "unmanned" operational control. In the specific case of a vehicle traffic or vehicle parking zone, relative navigation systems can be particularly useful as vehicles can rely on complete or partial automation for traffic or parking plan information, or instruction on following the same.

While "a set of" various elements will be described, it will be understood that "a set" can include any number of the respective elements, including only one element. Also as used herein, while sensors or detectors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, relative sizes, and vehicle types reflected in the drawings attached hereto can vary.

Figure 1:
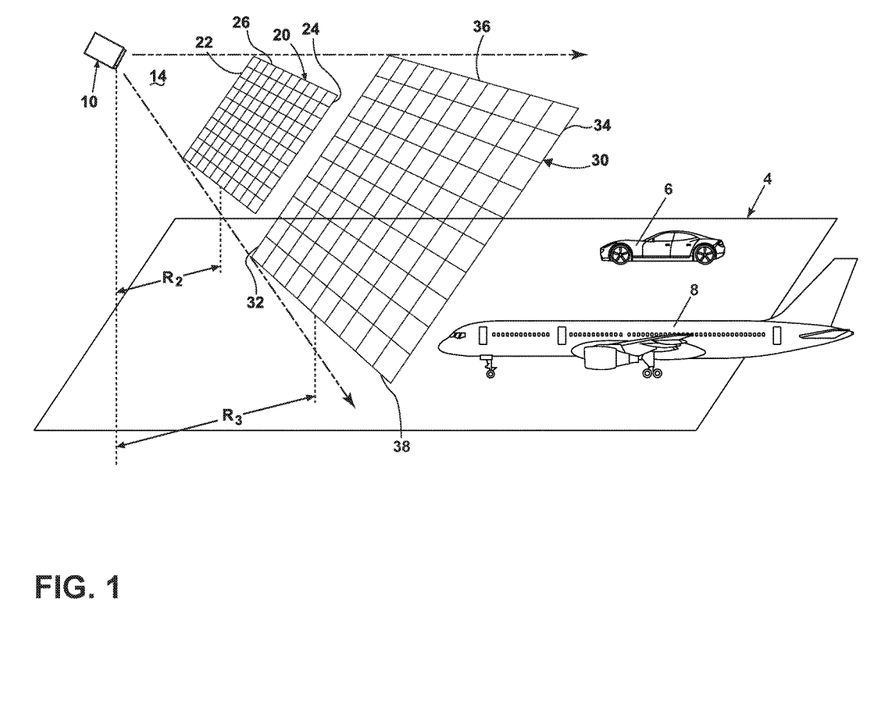
FIG. 1 is a perspective view of a vehicle traffic control system and vehicles, in accordance with various aspects described herein.

FIG. 1 illustrates an embodiment of a vehicle traffic control system 2 for a defined or bounded zone 4. The vehicle traffic control system 2 is illustrated as including a set of grid generators 10 (illustrated as a single grid generator 10 for understanding), and at least one vehicle, illustrated as a car 6 and an aircraft 8. Aspects of the car 6 or aircraft 8 can include manually controlled vehicles, unmanned vehicles (UVs), or a combination thereof.

The grid generator 10 can be configured to selectively project a grid, such as a set of intersecting lines, into space within a field such as a field of transmission or field of regard (FOR) 14. More specifically, the grid generator 10 repeatedly projects the grid into three-dimensional space to define the FOR 14. In one aspect, the FOR 14 can overlap with, or include the zone 4, and can be utilized to define a relative navigation grid related to the zone 4. Aspects of the disclosure can be included wherein the grid generator 10 is elevated above the zone 4, set of vehicles 6, 8, or ground level such that the projected grid or FOR 14 can be directed slightly downward. In this sense, the grid generator 10 can project at least a partially top-downward facing grid, as shown. Aspects of the disclosure can also be included wherein the grid in space generated by the grid generator 10 can be detected by at least one vehicle 6, 8, as described herein.

The general details of how to project the grid are known in the art, which include the disclosure in U.S. Pat. No. 7,681,839, issued Mar. 23, 2010, entitled Optical Tracking System For Refueling, and U.S. Pat. No. 8,386,096, issued Feb. 26, 2013, entitled Relative Navigation System, both of which are incorporated by reference. Therefore, the general details of the grid generation will not be fully described in this application.

As illustrated, the projected grid can include intersecting lines. At some distance away from the grid generator 10, these intersecting lines are observed as a grid in space, with the size of the grid increasing away from the grid generator 10. For description purposes, the grid generator 10 can be thought of as projecting intersecting lines substantially in the downward y direction of the coordinate system. If one were to observe the projection of intersecting lines in the x-z plane at some distance $R_2$ away from the grid generator 10, one would observe a first grid 20. If one were to observe the same projection of intersecting lines at a distance $R_3$, which is greater than the first distance $R_2$ in the x-z plane, one would observe a second grid 30, which appears relatively larger than the first grid 20.

The first grid 20 at a distance $R_2$ away from the grid generator 10 is spatially bound in the horizontal direction by a first vertical line 22 and a second vertical line 24. There exists a set of vertical lines spatially and temporally generated in between the first vertical line 22 and the second vertical line 24. The first grid 20 at a distance $R_2$ away from the grid generator 10 is spatially bound in the vertical direction by a first horizontal line 26 and a second horizontal line 28. There exists a set of horizontal lines spatially and temporally generated in between the first horizontal line 26 and the second horizontal line 28. The distance $R_2$ can be any distance between the grid 20 and the grid generator 10.

The second grid 30 at a distance $R_3$ away from the grid generator 10 is for all practical purposes the same as the first grid 20, but at further distance from the grid generator 10 than the first grid 20. The grid 30 is spatially bound in the horizontal direction by a first vertical line 32 of the second grid 30 and a second vertical line 34 of the second grid 30. There exists a set of vertical lines spatially and temporally generated in between the first vertical line 32 of the second grid and the second vertical line 34 of the second grid. The second grid 30 at a distance $R_3$ away from the grid generator 10 is spatially bound in the vertical direction by a first horizontal line 36 of the second grid 30 and a second horizontal line 38 of the second grid 30. There exists a set of horizontal lines spatially and temporally generated in between the first horizontal line 36 of the second grid and the second horizontal line 38 of the second grid.

The similarity of the grids 20 and 30 becomes apparent in the case of projected grid lines, where the grid 30 is formed by the same lines forming the grid 20, except that the grid 30 is observed at a further distance from grid generator 10, making the grid 30 appear larger than the grid 20. In this sense, the grid 30 is the appearance of the grid lines generated by the grid generator at the distance $R_3$ whereas the grid 20 is the appearance of the grid lines at the distance $R_2$.

The grids 20 and 30 can be of any number of lines. As illustrated, they include ten vertical lines by ten horizontal lines. A grid including a greater number of intersecting lines can result in improved detection for a fixed FOR 14 and distance from the at least one vehicle 6, 8 than a grid including a fewer number of intersecting lines. The grids 20 and 30 are depicted as a square shape, but this is not a requirement. The grid can be any shape including rectangular, oval, or circular. Furthermore, the intersecting lines of the grids 20 and 30 are depicted as orthogonal; however, this is not a requirement. The angles between the intersecting lines can be right angles, acute angles, or obtuse angles in different parts of the grid.

The vertical and horizontal lines can be formed in any suitable manner by the grid generator 10. For example, all of the lines can be formed sequentially or all at once. Either one of the vertical lines or horizontal lines can be formed before the other. The grid generator can alternate between vertical and horizontal lines. When the grid generator 10 uses a scanning laser to form the grid, the laser will sequentially form all of one of the vertical and horizontal lines, followed by the sequential forming of the other of the vertical and horizontal lines. The rate at which the lines are sequentially formed can be so fast that for practical purposes, it is as if all of the grid lines were simultaneously formed. The radiation source for the set of projected lines can be a coherent or incoherent radiation source. For example, when the radiation source is a coherent source, it can be a solid state laser that emits radiation at a wavelength in the near-UV or near-infrared (IR) range. In one non-limiting example, the laser can emit radiation at 1550 nm wavelength. In another non-limiting example, the laser can emit light based on the expected or localized environmental conditions. For instance, UV or blue wavelengths can be appropriate for underwater environments while IR is useful in decreased visual environments including, but not limited to, dust, rain, fog, or the like.

Additionally, the radiation frequency and/or intensity can be selected, or attenuated by use of an optical filter, to produce an eye safe grid. The grid of intersecting projected lines can be generated by raster scanning each of the lines or by projecting and scanning an elongated radiation beam. Any suitable methods and apparatus for generating the intersecting lines can be used.

Although, examples shown use Cartesian coordinates, any appropriate coordinate system can be used including polar, cylindrical, or spherical coordinate systems for both grid generation and for grid detection. For example, to form a grid amenable to polar coordinate representation, a series of concentric circles and lines radiating out from the center of those circles can be projected by the grid generator into space.

Grid data can be included, embedded, or otherwise encoded at one or more locations of the grid. By grid data, it is meant that the structure or characteristic of the grid provides data or information that can be read or detected. In one non-limiting aspect of the disclosure, the projected lines including the series of projected intersecting lines are encoded with different grid data in different regions of the grid to indicate regions within the grid of intersecting lines. In this manner, the lines encoded with grid data are configured to identify predetermined points on the relative navigation grid. One manner of encoding of the grid data is by modulating the beam in the case of a laser being used to form the grid. The modulation is achieved by changing the intensity of the beam and/or blocking the beam with some periodicity. Such a grid data can include a number and it is contemplated that each of the grid lines can include a number, which identifies the grid line.

Examples of defined or bounded zones 4 of the vehicle traffic control system 2 can include, but are not limited to, vehicle traffic zones such as roads, pathways, lanes, and the like, vehicle parking zone wherein the parking is temporary (e.g. minutes or hours, etc.) or longer-term (e.g. days or longer), or a combination thereof. A combination zone 4 for vehicle traffic and vehicle parking can include, but is not limited to, a parking lot, a flight deck, such as on a ship, a hanger deck, an airport, such as a ramp area, a multi-level parking structure, or the like.

Figure 2:
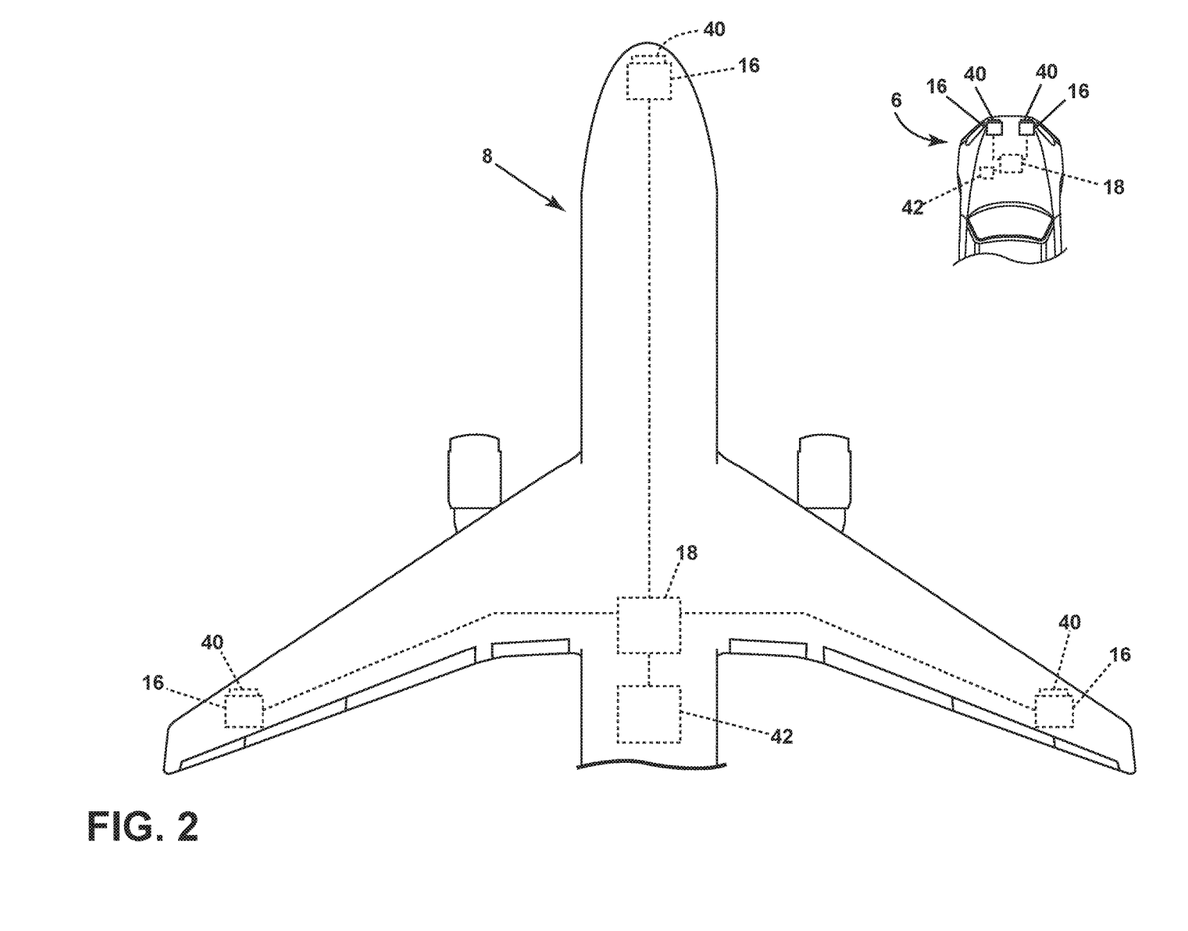
FIG. 2 is a schematic illustration of the vehicles of FIG. 1, in accordance with various aspects described herein.

FIG. 2 is a schematic top-down illustration of the car 6 and aircraft 8 of FIG. 1. As shown, the car 6 can include a set of detector modules 16, illustrated as having dual spaced detector modules 16, a controller module 18, and a communication link 42. The set of detector modules 16 can include a corresponding set of lenses, such as wide-angle lenses 40. The set of detector modules 16 can be communicatively coupled with the controller module 18, which can be further communicatively coupled with the communication link 42. The set of detector modules 16 can be associated with, arranged on, or mounted on the car 6 such that the detector modules 16 can be capable of, or operably configured to simultaneously receive the set of lines defining the relative navigation grid generated by the grid generator 10, such as via the wide-angle lenses 40. For instance, in one non-limited aspect of the disclosure, the set of detector modules 16 can be surface-mounted to the car 6 by way of a mechanical, magnetic, or adhesive fastener.

The aircraft 8 can include a set of detector modules 16, illustrated as a first and a second detector module 16 on respective wings, and a third detector module 16 on the nose of the aircraft 8. Similar with the car 6, the set of detector modules 16 can include a corresponding set of lenses, such as wide-angle lenses 40. The set of detector modules 16 of the aircraft 8 can also be communicatively coupled with a controller module 18 on the aircraft 8, which can be further communicatively coupled with a communication link 42. The set of detector modules 16 can be associated with or mounted on the aircraft 8 such that the detector modules 16 can be capable of, or operably configured to receive the set of lines defining the relative navigation grid generated by the grid generator 10, such as via the wide-angle lenses 40. For instance, in one non-limited aspect of the disclosure, the set of detector modules 16 can be surface-mounted to the aircraft 8 by way of a mechanical fastener or adhesive.

The set of detector modules 16 of the car 6 or aircraft 8 can be configured or enabled to generate a sensor output based on a location of the respective detector module 16 in the relative navigation grid, when receiving or exposed to the grid projected by a grid generator 10. In one non-limiting example, the set of detector modules 16 can optically receive or be optically exposed to the projected grid via the respective wide-angle lens 40. Non-limiting aspects of the disclosure can also be included wherein the set of detector modules 16 can be configured or enabled to read, understand, or decode grid data to, for instance, identify predetermined points on the relative navigation grid, as described herein. In this sense, the grid projected by the grid generator 10 can be sensed, measured, read, decoded, interpreted, or otherwise "understood" by the detector module 16. In this example aspect of the disclosure, it is presumed that the detector module 16 of the car 6 or aircraft 8 lies within the FOR 14 of the grid generator 10, enabling the detector module 16 to "see" the grid. As described herein, the set of detector modules 16 for the car 6 or aircraft 8 can operate with substantial similarity.

Non-limiting aspects of the sensor output can include a location of the detector module 16 or vehicle 6, 8 relative to the projected grid, relative to the grid generator 10, relative to the zone 4 or sub-zone within the zone 4, or the like. Another non-limiting aspect of the sensor output can include at least one directional characteristic of the vehicle 6, 8, relative to the projected grid, grid generator 10, zone 4 or sub-zone, or the like. For instance, a directional characteristic of the vehicle 6, 8 can include, but is not limited to, a heading, a speed, a trajectory, an orientation, a vector, or the like. In this sense, the sensor output can be based on a location in the relative navigation grid, including but not limited to, at least one navigation output, including, but not limited to, the a directional characteristic, the heading, the speed, the trajectory, the orientation, the vector of the vehicle 6, 8, or the like. Yet another non-limiting aspect of the sensor output can include vehicle 6, 8 information, including vehicle type information (model number, serial number, make, characteristics, etc.) or a vehicle configuration information (e.g. current weight, cargo capacity, cargo content, wheel configuration, maintenance records, pilot or driver presence, or physical adjustments such as wing panels fold state, helicopter rotors fold state, fuel levels, plan information for the vehicle such as destination and timing schedule, etc.). As used herein, vehicle type information, vehicle configuration information, or a combination thereof can be collectively referred to as "vehicle information." Additionally the vehicle information can include, but is not limited to, vehicle size, vehicle dimensions, and horizontal or vertical clearances at various vehicle locations (e.g. aircraft 8 nose, engine, tail, wingspan, or car 6 height).

While the sensor output can be generated by the set of detector modules 16, aspects of the disclosure can be included wherein a subset of sensor outputs, or a partial sensor output can be generated by the set of detector modules 16 and provided to the controller module 18 of the vehicle 6, 8. In this non-limiting aspect of the disclosure, the controller module 18 can accumulate, roll-up, lookup, or otherwise determined at least a subset of the vehicle information, sensor output, or navigation output. For example, at least two detector modules 16 reporting their respective locations within the projected grid can used by the controller module 18 to determine a respective heading of the car 6 if the detector modules 16 are fixedly disposed at a predetermined location on the car 6. In another example, the controller module 18 can include a set of vehicle information related to the vehicle 6, 8 such as the make, model, etc., as well as receive additional sensed, measured, or received data from other sources, such as the wheel configuration, maintenance records, wing panels fold state, or the like. Non-limiting aspects of the disclosure can be included wherein the vehicle 6, 8 can be controllably operated by way of the controller module 18, or another controller, processor, module, or the like communicatively coupled with the controller module 18.

Regardless of which of the detector modules 16, controller module 18, or combination thereof determines, associates, or gathers the vehicle information, at least a subset of the vehicle information can be operably provided to the communication link 42 such that information can be transmitted from the vehicle 6, 8. It is contemplated that the communication link 42 can be a wireless communication link and can be any variety of communication mechanism capable of wirelessly linking with other systems and devices and can include, but is not limited to, packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, optical data link suitable for emission-controlled operations, or any combinations thereof. It will also be understood that the particular type or mode of wireless communication is not critical to embodiments of the invention, and later-developed wireless networks are certainly contemplated as within the scope of aspects of the disclosure.

Further, the communication link 42 can be communicably coupled with at least one of the detector modules 16 or the controller module 18 through a wired link without changing the scope of aspects of the disclosure. Further still, the communication link 42 can be a wired communication link that can be physically coupled with a component or system to transfer information thereto. Although only one communication link 42 has been illustrated on the respective vehicles 6, 8, it is contemplated that a vehicle 6, 8 can have multiple communication links 42. Non-limiting aspects of the disclosure can also be included wherein, for example, the communication link 42 is further configured to operably receive information or transmissions (in addition to sending transmissions).

While the car 6 is shown including two detector modules 16 and the aircraft is shown including three detector modules 16, non-limiting aspects of the disclosure can include wherein a vehicle includes additional or fewer detector modules 16, including, but not limited to, sets of side-facing modules 16, rear-facing modules 16, front-facing modules 16, or a combination thereof, so long as the set of vehicles has a corresponding at least one detector module 16 associated therewith.

Figure 3:
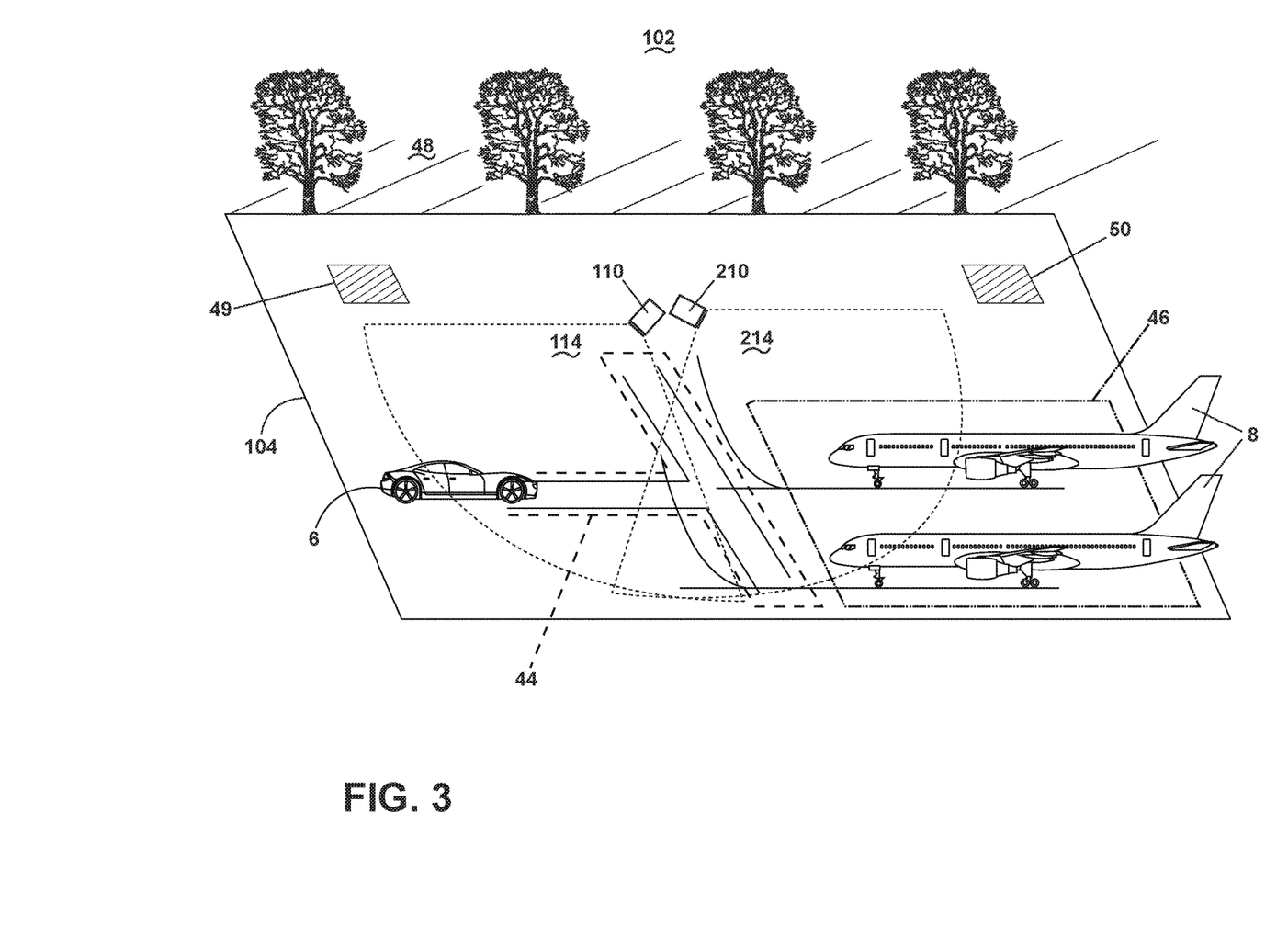
FIG. 3 is another perspective view of a vehicle traffic control system and vehicles, in accordance with various aspects described herein.

FIG. 3 illustrates another vehicle traffic control system 102. The vehicle traffic control system 102 is similar to the vehicle traffic control system 2; therefore, like parts will be identified with like numerals increased by 100 or 200, with it being understood that the description of the like parts of the vehicle traffic control system 2 applies to the vehicle traffic control system 102, unless otherwise noted. As illustrated, the vehicle traffic control system 102 can include a set of grid generators, illustrated as a first grid generator 110 having a first FOR 114 and a second grid generator 210 having a second FOR 214. The set of grid generators 110, 210 can be directionally disposed such that they are configured to project overlapping FOR 114, 214 or overlapping relative navigation grids.

Non-limiting aspects of the set of grid generators 110, 210 can include configuring the generators 110, 210 or projected grid can be rotationally pivoted from their respective vantage point to cover an overlapping area. Aspects of the disclosure can be included such that the first grid or FOR 14 is distinguishable from the second grid or FOR 14. In this sense, at the set of detector modules 16 or vehicles 6, 8 can be configured such that they can be aware of which navigation grid from a set of grid generators 110, 210 they are detecting. The distinguishing aspects can be implemented or configured at the origination of the respective grids, that is, at the grid generators 110, 210, or implemented at the destination of the grids, such as implemented in the set of detector modules 16.

In another non-limiting aspect of the set of grid generators 110, 210, the respective generators 110, 210 can be configured to project relative navigation grids that are out of phase with an adjacent relative navigation grid projected by a different generator 110, 210. As used herein, "out of phase" can include non-alignment of rotational scanning of the respective FOR 114, 214 of the grid generators 110, 210, or phasing of the projection of the navigation grid itself (e.g. horizontal or vertical lines 20-26, 32-38, as described herein, or sequentially projecting a grid in the same area based on the phasing or forming of the sequential lines or all lines at once). In yet another non-limiting aspect of the set of grid generators 110, 210, the generators 110, 210 can utilize additional encoding mechanisms to distinguish the first FOR 114 or grid from the second FOR 214 or grid. For example, including a set of Manchester bits or including an additional set of Manchester bits can be encoded into the projected grid. In another non-limiting aspect of the disclosure, the set of grid generators 110, 210 can be communicatively coupled with a common timing module, or in a master and slave relationship, to enable or employ the out of phase configurations, the timing of mechanical rotation or scanning of the generators 110, 210, or encoding to distinguish the respective FOR 114, 214.

Non-limiting aspects of the disclosure can be included wherein the set of grid generators 110, 210 are arranged or configured such that a vehicle 6, 8 will detect a single projected grid at a time. Additionally, aspects of the disclosure can be included wherein a vehicle 6, 8 can move or transition from the first grid generator 110 or first FOR 114 to the second grid generator 210 or second FOR 214 seamlessly, and without interruption of determination of the vehicle location based on the respective projected grid.

Non-limiting aspects of the vehicle traffic control system 102 can include a zone 104 that can be subdivided into a set of subzones. For example, a first subzone can include a vehicle traffic zone 44 wherein moving vehicles 6, 8 can be expected or arranged for movement between locations. Non-limiting aspects of the vehicle traffic zone 44 can include, but are not limited to, roads, pathways, runways, walkways, and the like. In another example, a second subzone can include a vehicle parking zone 46 wherein vehicles 6, 8 can be expected or arranged to be stationary for a period of time without interrupting or interfering with other movement zones, such as the vehicle traffic zones 44. Non-limiting aspects of the vehicle parking zone 46 can include parking lots, holding patterns, temporary or permanent holding zones, or the like.

Additional non-limiting aspects of the vehicle traffic control system 102 can include a set of "no-go," "keep out," or "restricted" zones wherein vehicles 6, 8 are not permitted, or permitted only in limited or conditional situations. For instance, a first restricted zone can include an unpaved area 48 defining an edge of the zone 104. In another instance, a second restricted zone can include a perimeter or footprint 49 of a building, a structural obstacle, permanent structure, or semi-permanent structure such as a light post, a hanger wall, or a control tower. In yet another instance, a third restricted zone can include a conditionally or situationally restricted zone, such as an elevator 50, wherein a vehicle 6, 8 is only permitted or allowed to intrude or proceed into the conditionally restricted zone upon satisfaction of a set of conditions. In the elevator 50 example, a set of conditions to be satisfied can include, but are not limited to, verifying the elevator 50 is on the same floor or level of the vehicle 6, 8, the elevator 50 has ceased moving, or the elevator is free of other vehicles 6, 8 (e.g. the elevator 50 is empty and can accept the vehicle 6, 8). At least a subset of the aforementioned zones 44, 46, 48, 49, 50, 104 can be provided or covered by the projected grid or FOR 114, 214 of at least one of the set of grid generators 110, 210.

While the illustrated configuration of the vehicle traffic control system 102 includes two grid generators 110, 210, aspects of the disclosure can be included in a vehicle traffic control system 2, 102 having additional of fewer grid generators 110, 210, and alternative placement of said additional or fewer grid generators 110, 210. For instance, additional grid generators 110, 210 can be placed at edges of the zone 104 looking inward toward the center of the zone 104, or additional grid generators 110, 210 can be disposed to provide multiple levels of overlapping projected grids or FORs 114, 214. In another non-limiting aspect of the disclosure, the set of grid generators 110, 210 can be arranged and configured such that they are out of phase or distinguishable based on, for instances, the common timing module. In the illustrated example, the first and second grid generators 110, 210 can be 180 degrees out of phase relative to each other. In a vehicle traffic control system 102 having three grid generators 110, 210, the grid generator can be, for example, sixty degrees out of phase.

Figure 4:
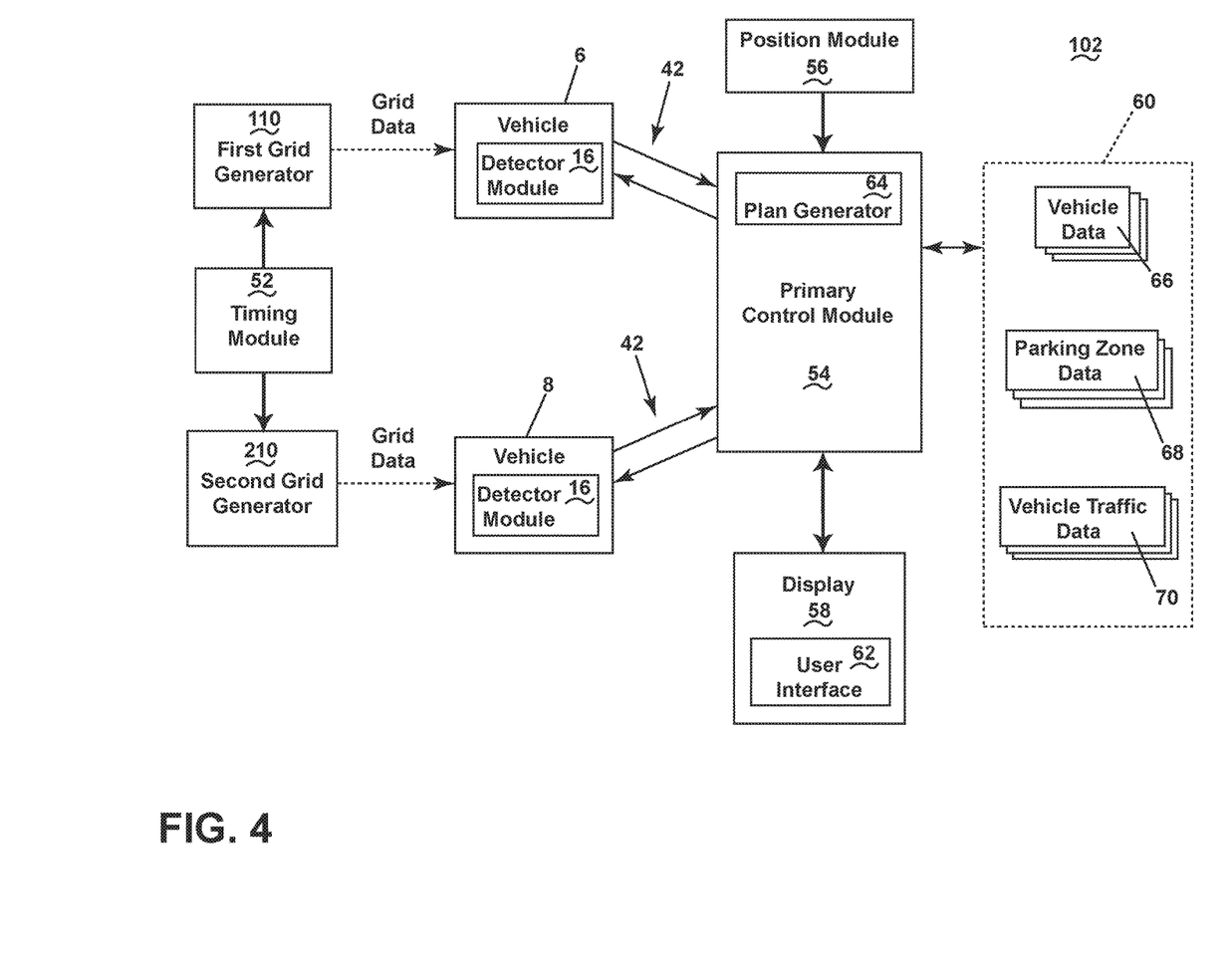
FIG. 4 is a schematic system diagram of the vehicle traffic control system of FIG. 3, in accordance with various aspects described herein.

FIG. 4 illustrates a schematic system diagram of the vehicle traffic control system 102. The vehicle traffic control system 102 can include the first grid generator 110, the second grid generator 210, a common timing module 52 for the set of grid generators 110, 210, and the vehicles 6, 8. The vehicle traffic control system 102 can further include a primary control module 54, a position module 56, a display 58, and a data module 60. While the display 58 is illustrated separated from the vehicles 6, 8, non-limiting aspects of the disclosure can be included wherein the display 58 is included in at least one of the vehicles 6, 8. Likewise, non-limiting aspects of the disclosure can be included wherein the controller module of the detector modules 16 can be included with the primary controller module 54 such that the controller module 18 can accumulate, roll-up, lookup, or otherwise determined at least a subset of the vehicle information, as described herein.

The primary control module 54 can include a plan generator 64, and can be configured to communicatively interact with the vehicles 6, 8, the position module 56, the display 58, and the data module 60. The illustrated example of unidirectional or bi-directional arrows can demonstrate directional communication between the respective components and the primary control module 54. Aspects of the disclosure can also be included wherein alternative communications or communicative pathways can include unidirectional or bi-directional communications between the respective set of components.

The primary controller module 54 or plan generator 64 can also include a processor and memory. The memory can store a set of operational control profiles or programs for operating the controller module 54 or the plan generator 64. The memory can include random access memory (RAM), read-only memory (ROM), flash memory, or one or more different types of portable electronic memory, such as discs, DVDs, CD-ROMs, etc., or any suitable combination of these types of memory. The primary controller module 54 or plan generator 64 can be operably coupled with the memory such that one of the primary controller module 54, the plan generator 64, or the memory can include all or a portion of a computer program having an executable instruction set for controlling the operation of the aforementioned components, or a method of operating the same. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Machine-executable instructions, associated data structures, and programs represent examples of program code for executing the exchange of information as disclosed herein. Machine-executable instructions can include, for example, instructions and data, which cause a general purpose computer, special purpose computer, primary controller module 54, plan generator 64, or special purpose processing machine to perform a certain function or group of functions. In implementation, the functions can be converted to a computer program comprising a set of executable instructions, which can be executed by the primary controller module 54, plan generator 64, or processor.

The position module 56 can be configured to sense or measure a positional indication of at least one elevator 50 of the vehicle traffic control system 102, and generate or provide the positional output of the elevator 50 to the primary control module 54. The position module 56 can be representative of additional sensed or measured values relative to the vehicle traffic control system 102, for instances, as related to the zone 44, 46, 48, 49, 50, 104 or conditional zones. The display 58 can include a user interface 62 for user interaction with at least one of the primary control module 54 or the plan generator 64. Non-limiting aspects of the user interface 62 can include, but are not limited to a keyboard, a mouse, a touch screen device, speech recognition interactions, and the like.

The data module 60 can include memory accessible to at least one of the primary control module 54 or plan generator 64 for storage or recollection of data information or attributes. As shown, non-limiting aspects of the data module 60 can include vehicle data 66, parking zone data 68, or vehicle traffic data 70. Non-limiting examples of vehicle data 66 can include the vehicle size and dimensions, clearances, or the vehicle information described herein. Non-limiting examples of parking zone data 68 can include a known physical feature or set of features related to the vehicle parking zones 46 including location and border of the parking zones 46 relative to the zone 104 or a subset of additional zones 44, 46, 49, 50, capacity of the parking zone 46, current or planned occupancy of the parking zone 46, or temporal data related to subset thereof (e.g. vehicle 6 will be in the parking zone 46 for one hour, then that capacity will be available). Non-limiting examples of vehicle traffic data 70 can include a known physical feature or set of features related to the vehicle traffic zone 44 including location and border of the traffic zones 44 relative to the zone 104 or a subset of additional zones 46, 48, 49, 50, what types of vehicles 6, 8 can be routed on the traffic zones 44, traffic zone 44 speeds, current or planned occupancy of the traffic zone 44, individual vehicle transportation data (e.g. requested or planned travel relative to the zone 104) or temporal data related to subset thereof (e.g. vehicle 8 needs to travel across the traffic zone 44, thus implementing a traffic stop in all directions for one minute).

Non-limiting aspects of the vehicle 6, 8 or vehicle traffic control system 102 can be included wherein the vehicle traffic control system 102 organizes, plans, and executes movements of vehicles 6, 8 interacting with the zone 104. Another non-limiting aspect of the vehicle 6, 8 or vehicle traffic control system 102 can be included wherein the vehicle traffic control system 102 organizes, plans, and executes a lack of movements (e.g. waiting or stationary periods) of vehicles 6, 8 interacting with the zone 104. Yet another non-limiting aspect of the vehicle 6, 8 or vehicle traffic control system 102 can be included wherein the vehicle traffic control system 102 organizes, plans, and executes a combination of movements and a lack of movements (e.g. waiting or stationary periods) for vehicles 6, 8 interacting with the zone 104. For example, a first vehicle 6, 8 can be controllably operated or instructed to move while a second vehicle 6, 8 can be simultaneously or sequentially controllably operated or instructed to be or remain stationary.

For example, the timing module 52 can be communicatively coupled with the set of grid generators 110, 210 to provide a common timing signal to align or manage the phase of each respective grid generator 110, 210, as described herein. The grid generators 110, 210, can in turn, project a relative navigation grid encoded or including grid data onto the aforementioned zones 44, 46, 48, 49, 50, 104, or a subset thereof. The projected relative navigation grid can be received by a respective set of detector modules 16 (schematically represented as a single detector module 16) for the respective vehicles 6, 8. The detector modules 16 are configured to generate a sensor output based at least on the location of the detector module 16 relative to the grid, as described herein.

The vehicles 6, 8 can transmit at least a subset of the sensor or navigation output to the primary control module 54 by way of the communication link 42. The primary control module 54 or plan generator 64 can further receive inputs from, for instances, the position module 56, the user interface 62, and the data module 60 to enable, generate, or operably implement a traffic control plan for the respective vehicles 6, 8 of the zone 104. In one non-limiting example of the disclosure, the primary control module 54 or the plan generator can receive the current location of the respective vehicles 6, 8 in the zone 104, in addition to other data described herein. By querying, retrieving, or receiving data from the data module 60, including but not limited to, additional vehicle data 66 for the vehicles 6, 8, parking zone data 68, or vehicle traffic data 70, or a subset thereof, the primary control module 54 or the plan generator 64 can generate a set of plan information or plan data having transportation details, guidance, holding information, instructions, commands, or a combination thereof, for the respective vehicle 6, 8. Non-limiting aspects of the set of plan information can include a determined route or pathway to traverse for the vehicle 6, 8, planned or estimated time of departures or time of arrival, or load or cargo information. Additional non-limiting aspects of the set of plan information can include one or more vehicle traffic zones 44 to traverse, one or more vehicle parking zones 46 occupancy instructions, avoidance of one or more restricted zones 48, 49, or conditional access to one or more conditional zones such as the elevator 50.

The vehicle traffic control system 102 can be operably configured to, for instance, display the generated plan information on the display 58, or provide at least a portion of the plan information, or identifier information indicative of the generated plan information, for execution. In a non-limiting aspect of the disclosure, at least a portion of the plan information or displayed information can be relayed, transmitted, communicated, or the like, to the vehicle 6, 8 by way of the communication link 42. In this sense, a vehicle 6, 8 operator can follow the generated plan information, or an UV can follow the generated plan information. In yet another non-limiting aspect of the vehicle traffic control system 102, the generated plan information can be presented to a user on the display 58, and a user can approve a generated plan information for execution, for instance, by way of the user interface 62. In this sense, generated plan information can be approved, or even overridden, by a user.

Aspects of the disclosure can further be included wherein execution of the generated plan information by the vehicles 6, 8 is monitored, managed, or updated during the execution of the plan information. For example, one vehicle's 6, 8 plan can be interrupted or delayed based on unforeseen circumstances, such as a tree branch falling onto the planned vehicle traffic zone 44, or a prioritized traffic routing such as an ambulance. In this example, the vehicle 6, 8 can again detect the grid data, or can update grid data based on the current circumstances, and a new plan information or plan data can be generated.

Another aspect of the disclosure can be included wherein precise plan information can be generated for vehicles 6, 8 in close proximity to one another. For example, when the zone 104 is a flight deck, there is limited mobility space between vehicles 6, 8. The primary control module 54 or the plan generator 64 can receive vehicle data 66 from the data module 60, or vehicle information from the vehicle 6, 8, and generate specific plan information that incorporates, includes, or takes into account overlapping vehicle 6, 8 positions. In this sense, the vehicle traffic control system 102 can instruct vehicles 6, 8 or generate plan information wherein, for example, a car 6 having a known maximum clearance can traverse underneath an aircraft fuselage having a minimum clearance less than the known maximum clearance. Thus, the vehicle traffic control system 102 can generate plan information for vehicles 6, 8 that can pass relative to each other without collision based on known dimensional values or vehicle types and characteristics. Stated another way, the movements of the vehicles 6, 8 can be configured to avoid collisions with another vehicle or structure.

The vehicle traffic control system 102 can further generate a set of plan information for a corresponding set of vehicles 6, 8 based on the respective vehicle 6, 8 locations, and set of plan information. In this sense, the plan information of one vehicle 6, 8 can result in an alteration, timing, control, guidance, or holding information for another vehicle 6, 8.

Figure 5:
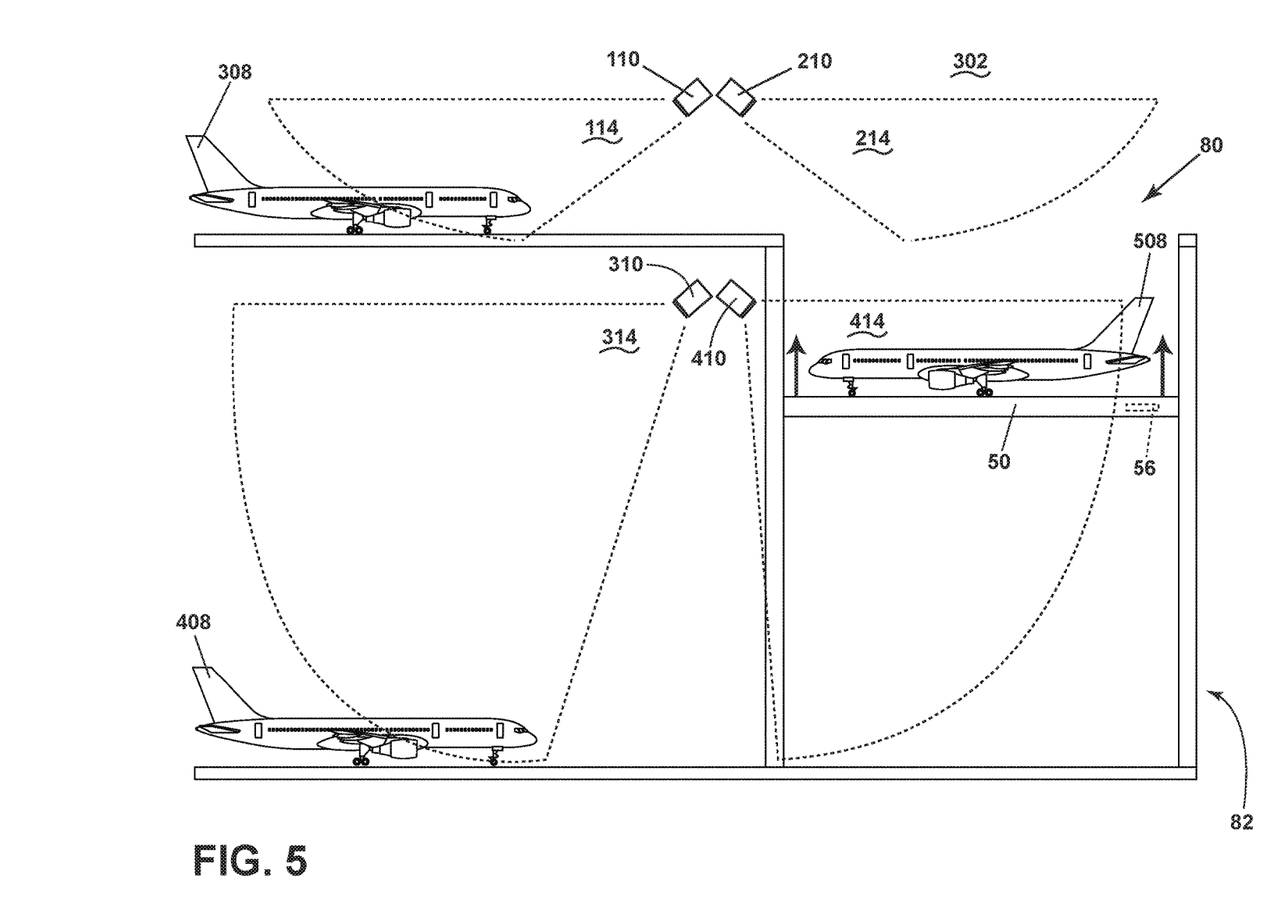
FIG. 5 is another perspective view of the vehicle traffic control system of FIG. 3, illustrating a multi-level configuration, in accordance with various aspects described herein.

FIG. 5 illustrates another aspect of a vehicle traffic control system 302 for a multi-level zone. The vehicle traffic control system 302 is similar to the vehicle traffic control system 2 and 102; therefore, like parts will be identified with like numerals increased to a 300 series number, with it being understood that the description of the like parts of the vehicle traffic control system 2, 102 applies to the vehicle traffic control system 302, unless otherwise noted. As shown, the zone can include a first level 80 and a second level 82, and wherein an elevator 50 travels between the levels 80, 82. As shown, the first level 80 includes a first grid generator 110 projecting a first FOR 114 and a second grid generator 210 projecting a second FOR 214. The second level 82 can include a third grid generator 310 projecting a third FOR 314 and a fourth grid generator 410 projecting a fourth FOR 414. The elevator 50 can also include the position module 56, as described herein.

As shown, a first aircraft 308 can follow plan information to travel from the first level 80 to the second level 82, a second aircraft 408 can follow plan information to travel from the second level 82 to the first level 82, and the elevator 50 can be in-transit from the second level 82 to the first level 80 while carrying a third aircraft 508, as sensed or measured by the position module 56. Aspects of the vehicle traffic control system 302 can be included wherein the first aircraft 308 can be following plan information controlling or commanding the aircraft 308 to conditionally wait in a vehicle traffic zone 44 or vehicle parking zone 46 until the elevator 50 has reached the first level 80, and until the third aircraft 508 has cleared the elevator 50 perimeter. Aspects of the vehicle traffic control system 302 can further be included wherein the elevator 50 is controllably operated by the vehicle traffic control system 302, the primary control module 54, or the plan generator 64 to move between levels 80, 82 in accordance with elevator-specific plan information or plan data. Additional non-limiting aspects of the disclosure can be included wherein, for instance, the elevator 50 can be controlled such that an unoccupied elevator 50 can be preemptively controlled by at least one of the vehicle traffic control system 302, the primary control module 54, or the plan generator 64 to meet an incoming vehicle 6, 8 having plan information to move between levels 80, 82. In this sense, the pre-emptive elevator 50 movement can further reduce wait or parking time during plan information execution.

Figure 6:
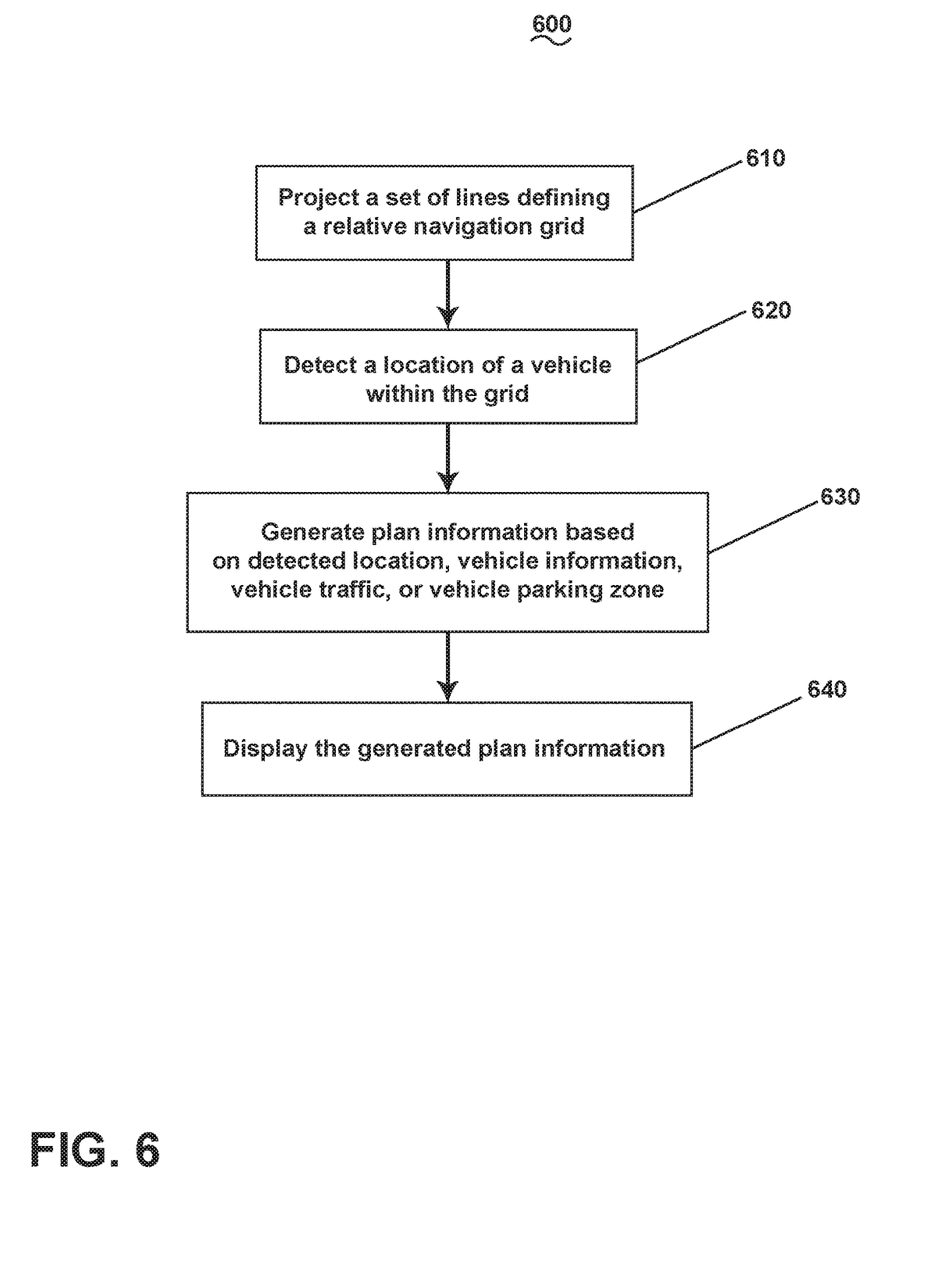
FIG. 6 is a flow chart of a method for generating plan information for vehicles in a vehicle traffic zone or vehicle parking zone, in accordance with various aspects described herein.

FIG. 6 illustrates a flow chart demonstrating a method 600 of generating plan information for vehicles 6, 8 in a vehicle traffic zone 44 or vehicle parking zone 46. The method 600 begins by projecting into space, from a set of grid generators 10, 110, 210, 310, 410 at the vehicle traffic zone 44 or vehicle parking zone 46, a set of lines defining a relative navigation grid and encoded with grid data configured to identify predetermined points on the relative navigation grid, at 610. Next, the method 600 includes detecting, with a detector module 16 on a vehicle 6, 8, 308, 408, 508 a location of the vehicle 6, 8, 308, 408, 508 within the grid, at 620. The method 600 continues by generating plan information, including at least one of guidance or holding information for the vehicle 6, 8, based on the detected location, vehicle information, and information related to known physical features of the vehicle traffic zone 44, vehicle parking zone 46, or multi-level zone 80, 82 configuration, at 630. Finally, the method 600 can include displaying, on the display 58, the generated plan information, at 640. As explained herein, aspects of the method 600 can further include, but are not limited to, communications between the primary control module 54 and respective vehicles 6, 8, 308, 408, 508, for example, by way of the communication link 42. Additionally, non-limiting aspects of the disclosure can include continuous communications, simultaneous communications, or a combination thereof, for a set vehicles 6, 8, 308, 408, 508.

The sequence depicted is for illustrative purposes only and is not meant to limit the method 600 in any way as it is understood that the portions of the method can proceed in a different logical order, additional or intervening portions can be included, or described portions of the method can be divided into multiple portions, or described portions of the method can be omitted without detracting from the described method.

By way of non-limiting example, the method 600 can include further detecting, with the detector module 16, a heading of the vehicle 6, 8 and generating plan information based thereon. In another non-limiting example, the method 600 can include further providing guidance information to the vehicle 6, 8 based on the generated plan information.

Figure 7:
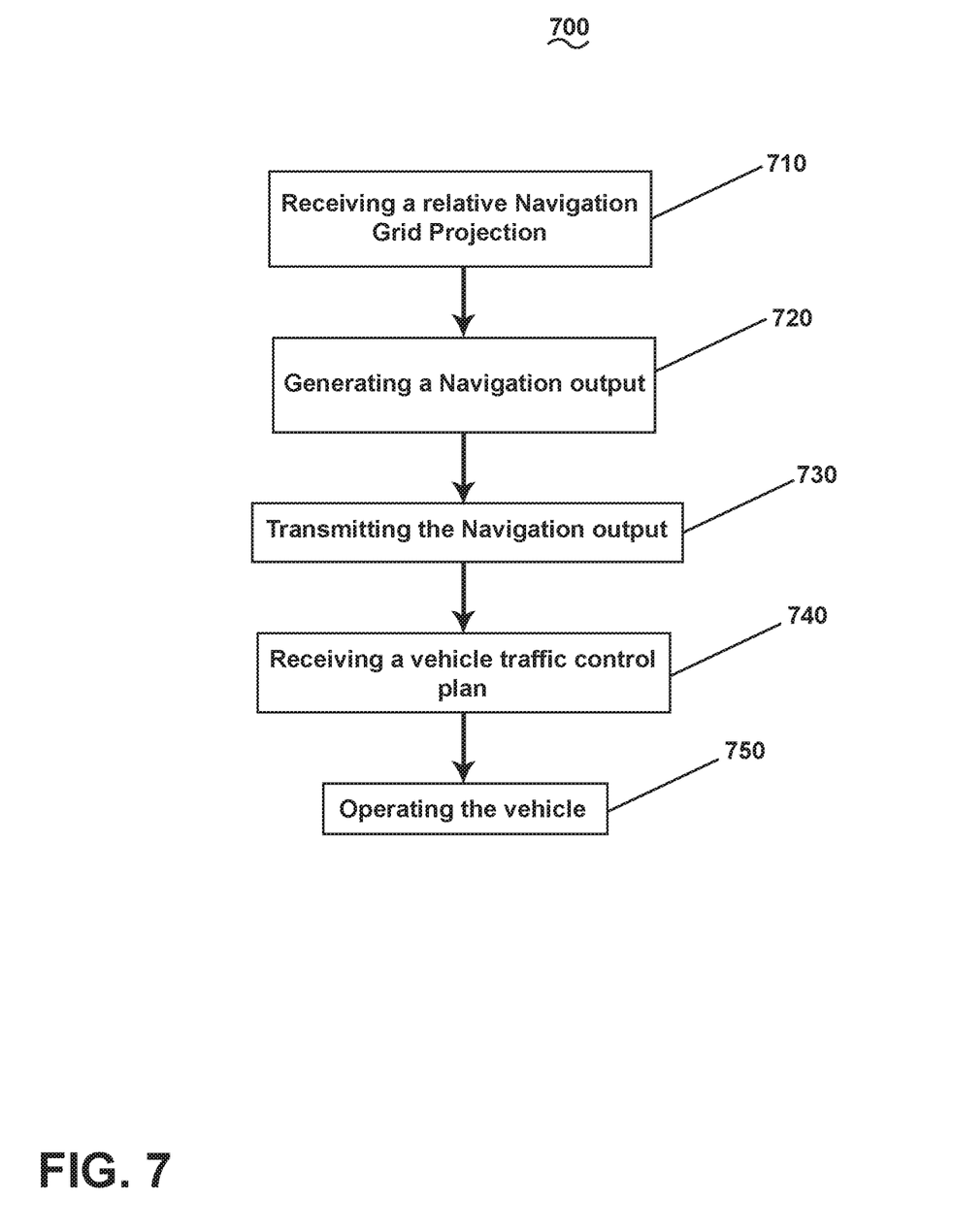
FIG. 7 is a flow chart of a method for operating vehicles in the vehicle traffic control system, in accordance with various aspects described herein.

FIG. 7 illustrates a flow chart demonstrating a method 700 of operating a vehicle 6, 8 in the vehicle traffic control system 102. The method 700 begins by receiving, by at least one detector module 16, or by a set of vehicles 6, 8, a relative navigation grid projection from a set of grid generators 10, 110, 210, 310, 410, at 710. Next, the method 700 includes generating at least one navigation output, or a set of navigation outputs from the corresponding set of vehicles 6, 8, based upon the received relative navigation grid projection, at 720. The method 700 continues by transmitting the at least one navigation output, or the set of navigation outputs, to a vehicle traffic control system 102, at 730. The method 700 then includes receiving, by at least one vehicle, a vehicle traffic control plan from the vehicle traffic control system 102, at 740. Finally, the method 700 can include operating the vehicle 6, 8, or at least one of the set of vehicles 6, 8, to execute the vehicle traffic control plan, at 750.

The sequence depicted is for illustrative purposes only and is not meant to limit the method 700 in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. For instances, while the grid generators 10, 110, 210, 310, 410 are illustrated at a high vantage point, projecting downward to the zones 104, and the vehicles 6, 8 are described having surface mounted detector modules 16, alternative configurations of the vehicle traffic control system can be included to ensure to enable grid projection and detection, as described herein. For instance, a grid generator 10, 110, 210, 310, 410 can be configured in a substantially top-down facing direction, or a substantially bottom-up facing direction, and the detector modules 16 can be correspondingly mounted on the vehicle to ensure detecting or receiving of the projected grid. In another non-limiting aspect of the disclosure, the set of vehicles 6, 8 can be configured to operate under a default control operation or default control scheme upon loss of detection of the projected grid, or upon loss of detection of the projected grid for an extended period of time. The default control operation or default control scheme can, for instance, stop the vehicle 6, 8 where it currently is and hold until receiving further instruction, or can automatically initiate plan information to navigate the vehicle to the nearest or most recently detected or determined vehicle parking zone until receiving further instruction.

The embodiments disclosed herein provide a method and system for generating plan information for a vehicle traffic control system. The technical effect is that the above described embodiments enable the automation and precision guidance for traffic control and management in a zone having a set of vehicles. One advantage that can be realized in the above aspects is that the above disclosure can automate the traffic management, storage, and interaction of a set of vehicles in a zone. In zones such as an airport or flight deck, where space is limited and many vehicle movements are taking place, automation can improve traffic guidance, improve efficiency, and reduce collision occurrences.

Furthermore, the above-described aspects can be utilized to plan traffic routes accordingly to reduce traffic backups, and efficiently utilize various pathways or traffic lanes. In yet another benefit of the disclosure, unmanned vehicles can be accounted for, and controllably operated in accordance with the traffic control system. In yet another benefit of the disclosure, the traffic control system can precisely guide vehicles relative to each other based on known dimensions, including identifying routes or guidance relative to another vehicle, wherein no collision will occur due to respective vehicle specifications, clearances, or the like.

Yet another advantage of the disclosure can include enabling the traffic control system over a multi-level zone configuration, wherein a single system operates the multiple zones as well as transportation between the zones, such as elevators. Altogether, the system can improve the safety of vehicle operations within the field of regard.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle traffic control system, comprising:
a set of grid generators, at a vehicle traffic or vehicle parking zone, with a grid generator configured to project into space a set of lines defining a relative navigation grid and encoded with grid data configured to identify predetermined points on the relative navigation grid;
a vehicle having at least one detector module configured to generate a sensor output based on a location of the detector module in the relative navigation grid;
a data module having information regarding vehicle size and dimensions and known physical features of the vehicle traffic or vehicle parking zone; and
a control module configured to receive the sensor output, determine a location of the vehicle within the grid, retrieve or receive information from the data module, generate plan information for the vehicle traffic or parking zone and display, on a display, the generated plan information.

2. The vehicle traffic control system of claim 1 wherein the vehicle traffic or parking zone is a flight deck, a hanger deck, or a ramp area of an airport.

3. The vehicle traffic control system of claim 1 wherein the set of grid generators comprises multiple grid generators configured to project overlapping relative navigation grids.

4. The vehicle traffic control system of claim 3 wherein the multiple grid generators are configured to project relative navigation grids that are 180 degrees out of phase with an adjacent relative navigation grid.

5. The vehicle traffic control system of claim 3, further comprising a timing module operably coupled to the set of grid generators and configured to control timing of scanning of the set of grid generators.

6. The vehicle traffic control system of claim 1, further comprising a set of vehicles having at least one detector module associated therewith.

7. The vehicle traffic control system of claim 6 wherein at least one of the vehicles is an aircraft.

8. The vehicle traffic control system of claim 7 wherein the aircraft includes two detector modules with wide angle lenses.

9. The vehicle traffic control system of claim 7, further comprising a data link configured to provide the aircraft with identifier information indicative of at least some of the generated plan information.

10. The vehicle traffic control system of claim 1 wherein the sensor output comprises a location in the grid and a heading.

11. The vehicle traffic control system of claim 10 wherein the sensor output further comprises vehicle type and vehicle configuration information.

* * * * *